US008016187B2

(12) United States Patent
Frantz et al.

(10) Patent No.: US 8,016,187 B2
(45) Date of Patent: Sep. 13, 2011

(54) MOBILE PAYMENT SYSTEM USING BARCODE CAPTURE

(75) Inventors: Didier Frantz, New York, NY (US); Manik Kakar, Harrison, NJ (US); Ashish Muni, Great Neck, NY (US)

(73) Assignee: Scanbury, Inc., New York, NY (US)

( * ) Notice: Subject to any disclaimer, the term of this patent is extended or adjusted under 35 U.S.C. 154(b) by 441 days.

(21) Appl. No.: 11/677,524

(22) Filed: Feb. 21, 2007

(65) Prior Publication Data

US 2007/0194123 A1    Aug. 23, 2007

Related U.S. Application Data

(60) Provisional application No. 60/774,929, filed on Feb. 21, 2006.

(51) Int. Cl.
*G06Q 40/00* (2006.01)
*G06K 7/10* (2006.01)

(52) U.S. Cl. .................................. 235/379; 235/472.01

(58) Field of Classification Search ........... 235/462.01–462.49, 472.01–472.03, 235/379; 705/23
See application file for complete search history.

(56) References Cited

U.S. PATENT DOCUMENTS

| | | |
|---|---|---|
| 4,238,768 A | 12/1980 | Mitsuya et al. |
| 4,323,973 A | 4/1982 | Greenfield |
| 4,554,593 A | 11/1985 | Fox et al. |
| 4,578,766 A | 3/1986 | Caddy |
| 4,692,603 A | 9/1987 | Brass et al. |
| 4,728,783 A | 3/1988 | Brass et al. |
| 4,754,127 A | 6/1988 | Brass et al. |
| 4,774,569 A | 9/1988 | Morton et al. |
| 4,782,221 A | 11/1988 | Brass et al. |
| 4,874,936 A | 10/1989 | Chandler et al. |
| 4,896,029 A | 1/1990 | Chandler et al. |
| 4,969,202 A | 11/1990 | Groezinger |
| 4,998,010 A | 3/1991 | Chandler et al. |
| 5,016,118 A | 5/1991 | Nannichi |
| 5,103,490 A | 4/1992 | McMillin |
| 5,113,454 A | 5/1992 | Marcantonio et al. |
| 5,153,418 A | 10/1992 | Batterman et al. |
| 5,179,599 A | 1/1993 | Formanek |
| 5,189,292 A | 2/1993 | Batterman et al. |
| 5,223,701 A | 6/1993 | Batterman et al. |
| 5,235,172 A | 8/1993 | Oehlmann |
| 5,243,443 A | 9/1993 | Eschbach |
| 5,243,444 A | 9/1993 | Fan |
| 5,243,655 A | 9/1993 | Wang |
| 5,276,315 A | 1/1994 | Surka |
| 5,327,240 A | 7/1994 | Golston et al. |
| 5,331,442 A | 7/1994 | Sorimachi |
| 5,345,317 A | 9/1994 | Katsuno et al. |
| 5,424,524 A | 6/1995 | Ruppert et al. |
| 5,510,604 A | 4/1996 | England |
| 5,621,203 A | 4/1997 | Swartz et al. |
| 5,642,485 A | 6/1997 | Deaton et al. |
| 5,664,110 A | 9/1997 | Green et al. |
| 5,691,773 A | 11/1997 | Wang et al. |
| 5,767,978 A | 6/1998 | Revankar et al. |
| 5,774,874 A | 6/1998 | Veeneman et al. |
| 5,778,092 A | 7/1998 | MacLeod et al. |
| 5,783,811 A | 7/1998 | Feng et al. |
| 5,811,781 A | 9/1998 | Ackley |
| 5,852,677 A | 12/1998 | Nakamura et al. |
| 5,862,270 A | 1/1999 | Lopresti et al. |
| 5,877,486 A | 3/1999 | Maltsev et al. |
| 5,890,021 A | 3/1999 | Onoda |
| 5,909,505 A | 6/1999 | Katayama et al. |
| 5,915,039 A | 6/1999 | Lorie et al. |
| 5,963,669 A | 10/1999 | Wesolkowski et al. |
| 5,969,325 A | 10/1999 | Hecht et al. |
| 6,045,515 A | 4/2000 | Lawton |
| 6,061,057 A | 5/2000 | Knowlton et al. |
| 6,082,619 A | 7/2000 | Ma et al. |
| 6,091,511 A | 7/2000 | Ben Dror et al. |
| 6,101,285 A | 8/2000 | Fan |
| 6,115,488 A | 9/2000 | Rogers et al. |
| 6,115,508 A | 9/2000 | Lopresti et al. |
| 6,137,898 A | 10/2000 | Broussard et al. |
| 6,144,848 A | 11/2000 | Walsh et al. |
| 6,167,383 A | 12/2000 | Henson |
| 6,199,099 B1 | 3/2001 | Gershman et al. |

(Continued)

FOREIGN PATENT DOCUMENTS

WO    WO-03060646    4/2003

(Continued)

OTHER PUBLICATIONS

Bottller, Stefan, "SMS-Flaschenpost erreicht Millionen," W&V Wochenmagazin Fur Marketing, Werbung, Medien and E-Business, Nov. 28, 2003, pp. 44-45.

(Continued)

*Primary Examiner* — Jamara A Franklin
(74) *Attorney, Agent, or Firm* — Wilmer Cutler Pickering Hale and Dorr LLP

(57) ABSTRACT

The present invention proposes to streamline the process by replacing most of the manual entry and mobile navigation through a mobile client application that will allow the user to [a] capture a barcode using a camera phone or any other camera-equipped communicating device such as a PDA with a camera attachment or a internet connected computer with a web-cam and [b] automatically send—or prepare the transmission of—the relevant information to the vendor directly or through the usage of a centralized platform.

30 Claims, No Drawings

U.S. PATENT DOCUMENTS

| | | |
|---|---|---|
| 6,201,612 B1 | 3/2001 | Matsushiro et al. |
| 6,201,901 B1 | 3/2001 | Zhou et al. |
| 6,249,773 B1 | 6/2001 | Allard et al. |
| 6,282,307 B1 | 8/2001 | Armato, III et al. |
| 6,347,156 B1 | 2/2002 | Kamada et al. |
| 6,366,696 B1 | 4/2002 | Hertz et al. |
| 6,371,373 B1 | 4/2002 | Ma et al. |
| 6,418,244 B2 | 7/2002 | Zhou et al. |
| 6,431,452 B2 | 8/2002 | Feng |
| 6,446,868 B1 | 9/2002 | Robertson et al. |
| 6,512,919 B2 | 1/2003 | Ogasawara |
| 6,565,003 B1 | 5/2003 | Ma |
| 6,577,861 B2 | 6/2003 | Ogasawara |
| 6,585,157 B2 | 7/2003 | Brandt et al. |
| 6,604,682 B2 | 8/2003 | Wakamiya et al. |
| 6,631,012 B2 | 10/2003 | Athens et al. |
| 6,631,843 B2 | 10/2003 | Schuessler |
| 6,650,766 B1 | 11/2003 | Rogers et al. |
| 6,651,053 B1 | 11/2003 | Rothschild |
| 6,674,919 B1 | 1/2004 | Ma et al. |
| 6,735,341 B1 | 5/2004 | Horie et al. |
| 6,735,745 B2 | 5/2004 | Sarig |
| 6,752,317 B2 | 6/2004 | Dymetman et al. |
| 6,802,450 B2 | 10/2004 | Cheung et al. |
| 6,832,729 B1 | 12/2004 | Perry et al. |
| 6,837,432 B2 | 1/2005 | Tsikos et al. |
| 6,850,901 B1 | 2/2005 | Hunter et al. |
| 6,898,329 B1 | 5/2005 | Takahashi |
| 6,970,837 B1 | 11/2005 | Walker et al. |
| 7,010,501 B1 | 3/2006 | Roslak et al. |
| 7,156,311 B2 | 1/2007 | Attia et al. |
| 7,242,816 B2 | 7/2007 | Attia et al. |
| 7,245,780 B2 | 7/2007 | Attia et al. |
| 7,287,696 B2 | 10/2007 | Attia et al. |
| 7,296,747 B2 | 11/2007 | Rohs et al. |
| 7,309,015 B2 | 12/2007 | Frantz et al. |
| 7,313,759 B2 | 12/2007 | Sinisi |
| 7,387,250 B2 | 6/2008 | Muni |
| 2001/0032252 A1 | 10/2001 | Durst et al. |
| 2001/0041581 A1 | 11/2001 | Hansson |
| 2001/0051901 A1 | 12/2001 | Hager et al. |
| 2002/0016750 A1 | 2/2002 | Attia |
| 2002/0049637 A1 | 4/2002 | Harman et al. |
| 2002/0050526 A1 | 5/2002 | Swartz et al. |
| 2002/0060246 A1 | 5/2002 | Gobburu et al. |
| 2002/0062251 A1 | 5/2002 | Anandan et al. |
| 2002/0065728 A1 | 5/2002 | Ogasawara |
| 2002/0071076 A1 | 6/2002 | Webb et al. |
| 2002/0084330 A1 | 7/2002 | Chiu |
| 2002/0090107 A1 | 7/2002 | Acharya et al. |
| 2002/0102966 A1 | 8/2002 | Lev et al. |
| 2002/0187774 A1 | 12/2002 | Ritter et al. |
| 2003/0007696 A1 | 1/2003 | Saito |
| 2003/0065738 A1 | 4/2003 | Yang et al. |
| 2003/0074286 A1 | 4/2003 | Rodrigo |
| 2003/0123710 A1 | 7/2003 | Nakazawa et al. |
| 2003/0132298 A1 | 7/2003 | Swartz et al. |
| 2003/0230630 A1 | 12/2003 | Whipple et al. |
| 2004/0042670 A1 | 3/2004 | Moroo et al. |
| 2004/0101183 A1 | 5/2004 | Mullick et al. |
| 2004/0240737 A1 | 12/2004 | Lim et al. |
| 2005/0035206 A1 | 2/2005 | Attia et al. |
| 2005/0091118 A1 | 4/2005 | Fano |
| 2005/0121521 A1 | 6/2005 | Ghai et al. |
| 2005/0125301 A1* | 6/2005 | Muni ............................. 705/23 |
| 2005/0198095 A1 | 9/2005 | Du et al. |
| 2005/0246196 A1 | 11/2005 | Frantz et al. |
| 2006/0011728 A1 | 1/2006 | Frantz et al. |
| 2008/0033835 A1* | 2/2008 | Philyaw ......................... 705/26 |
| 2008/0093460 A1 | 4/2008 | Frantz et al. |
| 2008/0254775 A1 | 10/2008 | Rohs |

FOREIGN PATENT DOCUMENTS

| | | |
|---|---|---|
| WO | WO-2005020140 A2 | 3/2005 |
| WO | WO-2005062234 A1 | 7/2005 |

OTHER PUBLICATIONS

Heckbert, Paul S., "Fundamentals of Texture Mapping and Image Warping," Department of Electrical Engineering and Computer Science, University of California, Master's Thesis, 1989.

Lew, Michael S., "Principles of Visual Information Retrieval," State of the Art in Shape Matching, 2001, pp. 87-119.

Lycos and Net Perceptions Launch Unbiased Cross-Merchant Product Recommendation Service, PR Newswire, New York: Nov. 16, 1999, pp. 1-3.

Rohs, Michael et al., "Entry Points into a Smart Campus Environment-Overview of the ETHOC System," Institute for Pervasive Computing Swiss Federal Institute of Technology, ICDCS 2003 Workshops, May 2003.

Trier, O.D., Jain, A.K., "Goal-Directed Evaluation of Binarization Methods", Pattern Analysis and Machine Intelligence, IEEE Transactions on, Dec. 1995, ISSN: 0162-8828.

Tsai, Roger Y., "A Versatile Camera Calibration Tedhnique for High-Accuracy 3D Maching Vision metrology Using Off-the-Shelf TV Cameras and Lenses," IEEE Journal of Robotics and Automation, 1987, RA-3(4):323-344.

Wellner, Pierre D., "Adaptive Thresholding for the DigitalDesk," EuroPARC Technical Report EPC-93-110, 1993, pp. 1-17.

* cited by examiner

MOBILE PAYMENT SYSTEM USING BARCODE CAPTURE

CROSS-REFERENCE TO RELATED APPLICATIONS

The present invention claims priority to U.S. Provisional Application Ser. No. 60/774,929, filed Feb. 21, 2006, which is herein incorporated by reference in its entirety.

BACKGROUND OF THE INVENTION

In order to utilize mobile communications to facilitate payment, current users have to manually type in multiple pieces of information into a mobile application or into a special SMS that is sent to a select vendor. Such information can include the amount due, payee identification information, user identification information, invoice reference numbers, etc. However, typing in this information using a small keypad especially those that are non-QWERTY, can be tedious for users and lead to input errors. As a result, mobile payment systems are usually seen as cumbersome to both the user and the vendor.

Therefore, there clearly exists a need for a mobile payment system which is virtually error free and easily implemented on existing mobile devices. In particular, the system should take advantage of many of the capabilities of current mobile devices, such as embedded cameras and ever-increasing processing power, in order to facilitate mobile payment.

SUMMARY OF THE INVENTION

The present invention provides a system and method for utilizing a combination of barcodes and mobile devices to perform payment transactions. In a preferred embodiment, the barcode is encoded with vendor payment information such as the amount due, a payee identification key, invoice reference number, etc. This barcode is then scanned utilizing a mobile device such as a camera phone or PDA and the payee information is extracted. This operation can be performed by either a client application located on the mobile device or a specific program designed for mobile payment. The decoded barcode information, along with information identifying the payer (e.g., an identification number, account number, credit card number, etc.) is then sent to the vendor or a central processing station wherein the payment is processed. The identification information may either be stored in the mobile payment application or entered manually by the user. In the preferred embodiment, the personal information is encoded if is stored locally on the mobile device.

The payment information can be transmitted utilizing any number of methods known in the art such as through a wireless network, socket connection via MMS, via SMS, etc. Once the payment information is processed, the user will then be sent a confirmation message on their mobile device.

Other objects, features, and characteristics of the present invention, as well as the methods of operation and functions of the related elements of the structure, and the combination of parts and economies of manufacture, will become more apparent upon consideration of the following detailed description.

DETAILED DESCRIPTION OF THE INVENTION

The present invention proposes to streamline the mobile payment process by replacing most of the manual entry and mobile navigation usually involved by employing a mobile client application which allows a user to [a] capture a barcode using a camera-equipped mobile device (such as a camera phone); and [b] automatically send—or prepare the transmission of—the relevant payment information to the vendor directly or through the usage of a centralized platform.

The barcodes that will be captured by the client application will either include all the necessary information to process the payment information (e.g., amount due, vendor identification number, etc.) that will be used in conjunction with preexisting information stored within the client application or the service platform (e.g., a user identification number, credit card information, etc.).

The user will first launch the client application and scan the barcode using the camera of his or her mobile device. A system and method for scanning barcodes utilizing a mobile device is disclosed in co-owned U.S. Pat. No. 7,156,311, the entire content of which is incorporated by reference herein in its entirety. Once the barcode is captured and decoded, the client application will send the decoded barcode information and the additional information contained in the client application, if needed, to either the vendor or a centralized platform that will relay the payment information to the appropriate vendor. In the preferred embodiment, the barcode is decoded directly on the mobile device. However, it is also possible to send the barcode image using an MMS or other means to the centralized platform for server-side decoding.

The barcode is encoded with a set of characters which usually occur on an invoice such as an amount due, bank account of payee, beneficiary, invoice type (i.e. any data that would allow identification of a payment). The barcode could also just embed the amount due, payment code, and payee code for a micro-payment. Additionally, the barcode may encode any other data string that will allow the payment to be fulfilled.

The barcode can encompass all necessary data either within the barcode (such as payment date, payment amount, payment type, account number, etc.) or the barcode can contain a reference which is stored in a database that sends back the data to the client application to fulfill payment.

In the preferred embodiment the barcode is a two-dimensional barcode such as is disclosed in co-pending U.S. patent application Ser. No. 11/105,150, filed Apr. 5, 2005. However, it should be obvious to one skilled in the art that any one-dimensional or two-dimensional barcode symbology can be utilized with the present invention.

Instead of being encoded within the barcode, some information, such as the payee or payer data, could be stored within the client application, within the solution backend, or within middleware platforms (associated with codes and an index embedded within the barcodes or as part of the application). In the preferred embodiment, the payer data is password protected in order to enhance security.

Once decoded, the client application establishes communication either directly with the vendor (when all of the required information is contained in the barcode and/or in the client application) or with a centralized platform that will relay the information to the vendor to process the payment. Use of a centralized platform will allow easy and secure storage of information related to the [a] the user (such as delivery address, bank or credit card information, preferred payment modalities, and/or to the vendor (such as vendor name, address, or banking information) and/or [b] the invoice (such as amount, tax amount, vendor identification key, etc.).

The transmission can be established over HTTP, socket communications, through the handset browser, or through any other like communication protocol. The transmission can also be launched by the barcode and/or the client application in order to trigger predefined actions such as sending an SMS, opening a USSD communication, launching and populating mobile application, etc.

The barcode information and all required information can be sent to the centralized platform or appropriate vendor in the following ways:

Over HTTP, socket connection, or through the mobile handset browser with all the required information being sent to the platform (whose address is pre-entered in the client application or embedded in the barcode) or to directly to the vendor. Once the information has been received by the centralized platform, it can either process the payment directly with the vendor or send back to the client application all the information required to process the payment from the device.

Using an automatically generated SMS so that the payer is identified by their cell phone number, thereby allowing either the mobile carrier to charge the appropriate amount or the user account or by a company managing the user account. The SMS will be sent to a number that can be either embedded in the barcode or pre-entered in the client application. The SMS can be triggered after decoding the barcode with information contained in the code and/or the client or after the client application had established a communication with the service platform and received all required information to process that SMS.

Unstructured Supplementary Service Data ("USSD") protocol with similar information and processing than the SMS described above.

In another embodiment, the client application located on the mobile device can instantaneously populate fields after barcode capture and decoding. The barcode capture client application will launch a dedicated mobile payment application and pre-fill most fields with information embedded in the barcode and/or received from the service platform. Encoding of the barcodes would be done according to a specific protocol so that the handset application would know how the data is formatted within the barcode.

After the payment transaction has been completed, it is preferable that the user is notified about the success of the transaction. In a preferred embodiment, the client application displays a message confirming that the payment has been processed. Alternatively, the vendor or centralized platform may send an MMS/SMS to the mobile device indicating that the payment has been processed.

While the present invention has been described with reference to one or more preferred embodiments, which embodiments have been set forth in considerable detail for the purposes of making a complete disclosure of the invention, such embodiments are merely exemplary and are not intended to be limiting or represent an exhaustive enumeration of all aspects of the invention. The scope of the invention, therefore, shall be defined solely by the following claims. Further, it will be apparent to those of skill in the art that numerous changes may be made in such details without departing from the spirit and the principles of the invention.

We claim:

1. A mobile device, comprising:
   a memory storing a payer payment identification;
   a scanning device for scanning a barcode encoded with (a) an amount due and (b) a payee identification identifying a payee;
   a first interface for communicating over a wireless network; and
   a processor in communication with the memory, the scanning device, and the first interface, programmed to:
      populate a payment transaction request including the amount due and the payer payment identification; and
      send the payment transaction request over the first interface to the payee identified by the payee identification.

2. The mobile device of claim 1,
   further comprising a second interface for receiving user input from a user;
   the memory further storing a stored-user password;
   the processor further in communication with the second interface and further programmed to receive an inputted password from the second interface, and to base the sending of the payment transaction request on a comparison of the stored-user password to the inputted password.

3. The mobile device of claim 1, wherein the processor is further programmed to send the payment transaction request using SMS.

4. The mobile device of claim 1, wherein the payee identification includes an SMS number and wherein the processor is further programmed to send the payment transaction request to the SMS number using SMS.

5. The mobile device of claim 1, the payee identification including a bank account number of the payee.

6. The mobile device of claim 2, the payer payment information including at least one of a bank account number and a credit card number.

7. The mobile device of claim 1, the processor further programmed to receive a confirmation from the payee that the payment transaction request has been processed.

8. The mobile device of claim 1, wherein the barcode includes at least one of one-dimensional or two-dimensional symbology.

9. A method, comprising:
   scanning a barcode encoded with (a) an amount due and (b) a payee identification identifying a payee using a scanning device;
   reading a payer payment identification from a local memory;
   populating a payment transaction request including the amount due and the payer payment identification; and
   sending the payment transaction request over a wireless interface to the payee identified by the payee identification.

10. The method of claim 9, further comprising receiving a first password from a user interface, and basing the sending of the payment transaction request on a comparison of a stored-user password stored in the local memory to the first password.

11. The method of claim 9, further comprising sending the payment transaction request using SMS.

12. The method of claim 9, wherein the payee identification includes an SMS number and further comprising sending the payment transaction request to the SMS number using SMS.

13. The method of claim 9, the payee identification including a bank account number of the payee.

14. The method of claim 9, the payer payment information including at least one of a bank account number and a credit card number.

15. The method of claim 9, further comprising receiving a confirmation from the payee that the payment transaction request has been processed.

16. The method of claim 9, wherein the barcode includes at least one of one-dimensional or two-dimensional symbology.

17. A mobile device, comprising:
   a memory storing a payer payment identification;

a scanning device for scanning a barcode encoded with (a) an amount due and (b) a payee identification identifying a payee;

a first interface for communicating over a wireless network; and a processor in communication with the memory, the scanning device, and the first interface, programmed to:

populate a payment transaction request including the amount due, the payer payment identification, and the payee identification;

send the payment transaction request over the first interface to a central platform;

receive additional information from the central platform for processing the payment transaction over the first interface; and send the payment transaction request over the first interface to the payee using the additional information.

18. The mobile device of claim 17, further comprising a second interface for receiving user input from a user;

the memory further storing a stored-user password;

the processor further in communication with the second interface and further programmed to receive an inputted password from the second interface, and to base the sending of the payment transaction request on a comparison of the stored-user password to the inputted password.

19. The mobile device of claim 17, wherein the processor is further programmed to send the payment transaction request using SMS.

20. The mobile device of claim 17, the payee identification including a bank account number of the payee.

21. The mobile device of claim 17, the payer payment information including at least one of a bank account number and a credit card number.

22. The mobile device of claim 17, the processor further programmed to receive a confirmation from the payee over the first interface that the payment transaction request has been processed.

23. The mobile device of claim 17, wherein the barcode includes at least one of one-dimensional or two-dimensional symbology.

24. A method, comprising:

scanning a barcode encoded with (a) an amount due and (b) a payee identification identifying a payee using a scanning device;

reading a payer payment identification from a local memory;

populating a payment transaction request including the amount due, the payer payment identification, and the payee identification;

sending the payment transaction request over a wireless interface to a central platform;

receiving additional information for processing the payment transaction from the central platform over the wireless interface; and sending the payment transaction request over the wireless interface to the payee using the additional information received from the central platform.

25. The method of claim 24, further comprising receiving a first password from a user interface, and basing the sending of the payment transaction request to the central platform on a comparison of a stored-user password stored in the local memory to the first password.

26. The method of claim 24, further comprising sending the payment transaction request to the payee using SMS.

27. The method of claim 24, the payee identification including a bank account number of the payee.

28. The method of claim 24, the payer payment information including at least one of a bank account number and a credit card number.

29. The method of claim 24, further comprising receiving a confirmation from the payee that the payment transaction request has been processed.

30. The method of claim 24, wherein the barcode includes at least one of one-dimensional or two-dimensional symbology.

* * * * *

UNITED STATES PATENT AND TRADEMARK OFFICE
CERTIFICATE OF CORRECTION

| | | |
|---|---|---|
| PATENT NO. | : 8,016,187 B2 | Page 1 of 1 |
| APPLICATION NO. | : 11/677524 | |
| DATED | : September 13, 2011 | |
| INVENTOR(S) | : Didier Frantz et al. | |

It is certified that error appears in the above-identified patent and that said Letters Patent is hereby corrected as shown below:

On the Title Page, Item (73), Assignee: "Scanbury, Inc." should read -- Scanbuy, Inc. --

Signed and Sealed this
Eighteenth Day of September, 2012

David J. Kappos
*Director of the United States Patent and Trademark Office*